(12) United States Patent
Fang et al.

(10) Patent No.: US 10,318,136 B2
(45) Date of Patent: Jun. 11, 2019

(54) OPERATION PROCESSING METHOD AND DEVICE

(71) Applicant: ZTE Corporation, Shenzhen (CN)

(72) Inventors: Wen Fang, Shenzhen (CN); Pan Ma, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 188 days.

(21) Appl. No.: 15/039,041

(22) PCT Filed: May 14, 2014

(86) PCT No.: PCT/CN2014/077485
§ 371 (c)(1),
(2) Date: May 25, 2016

(87) PCT Pub. No.: WO2014/180360
PCT Pub. Date: Nov. 13, 2014

(65) Prior Publication Data
US 2016/0357423 A1   Dec. 8, 2016

(30) Foreign Application Priority Data

Nov. 25, 2013  (CN) .......................... 2013 1 0607340

(51) Int. Cl.
*G06F 3/048*    (2013.01)
*G06F 3/0484*   (2013.01)
(Continued)

(52) U.S. Cl.
CPC ........ *G06F 3/04847* (2013.01); *G06F 3/0482* (2013.01); *G06F 3/04845* (2013.01); *G06F 3/04883* (2013.01); *H04M 1/72583* (2013.01)

(58) Field of Classification Search
CPC ............... G06F 3/04847; G06F 3/0482; G06F 3/04845; G06F 3/04883; H04M 1/72583
(Continued)

(56) References Cited

U.S. PATENT DOCUMENTS

2007/0036346 A1 * 2/2007 Kwon ................... G06F 3/0482
                                                           379/413
2009/0187842 A1   7/2009 Collins
(Continued)

FOREIGN PATENT DOCUMENTS

CN        101989176 A       3/2011
CN        102223437 A      10/2011
(Continued)

OTHER PUBLICATIONS

International Search Report for corresponding application PCT/CN2014/077485 filed on May 14, 2014; dated Sep. 12, 2014.
(Continued)

*Primary Examiner* — Howard Cortes
*Assistant Examiner* — Hassan Mrabi
(74) *Attorney, Agent, or Firm* — Cantor Colburn LLP

(57) ABSTRACT

Provided are an operation processing method and device, wherein the method includes that an element in a current interface is detected, at least one corresponding operation control is generated according to the element, and after it is determined that any one of the at least one operation control is moved onto the element, an operation corresponding to the moved operation control is executed on the element. The technical scheme solves the problem that devices operations tend to become complex, thus improving user operation experience.

15 Claims, 6 Drawing Sheets

(51) Int. Cl.
*G06F 3/0482* (2013.01)
*G06F 3/0488* (2013.01)
*H04M 1/725* (2006.01)

(58) Field of Classification Search
USPC .......................................................... 715/758
See application file for complete search history.

(56) References Cited

U.S. PATENT DOCUMENTS

| | | | | |
|---|---|---|---|---|
| 2010/0081419 A1* | 4/2010 | Chiang | ................. | G06F 3/0488 455/416 |
| 2010/0146451 A1* | 6/2010 | Jun-Dong | ............. | G06F 3/0482 715/841 |
| 2010/0262928 A1* | 10/2010 | Abbott | ................ | G06F 3/04817 715/769 |
| 2012/0094718 A1* | 4/2012 | Kim | .................. | H04M 1/72597 455/559 |
| 2012/0133604 A1* | 5/2012 | Ishizuka | ............... | G06F 1/1624 345/173 |
| 2012/0173995 A1* | 7/2012 | Alameh | ................ | G06F 3/0486 715/761 |
| 2013/0047114 A1* | 2/2013 | Murakami | ............ | G06F 3/0486 715/773 |
| 2013/0174094 A1* | 7/2013 | Heo | ..................... | G06F 3/04883 715/835 |
| 2013/0321308 A1* | 12/2013 | Lee | ......................... | G06F 3/041 345/173 |
| 2015/0334570 A1* | 11/2015 | Nade | ....................... | H04M 1/67 455/411 |

FOREIGN PATENT DOCUMENTS

| | | |
|---|---|---|
| CN | 102541429 A | 7/2012 |
| EP | 2060970 A1 | 5/2009 |
| JP | H08328808 A | 12/1996 |
| JP | 2009501391 A | 1/2009 |
| JP | 2012083919 A | 4/2012 |
| JP | 2012194638 A | 10/2012 |
| KR | 20110014040 A | 2/2011 |
| WO | 2013159536 A1 | 10/2013 |

OTHER PUBLICATIONS

European Search Report for corresponding application EP14794537; Report dated Oct. 28, 2016.

\* cited by examiner

OPERATION PROCESSING METHOD AND DEVICE

TECHNICAL FIELD

The present disclosure relates to the field of communications, particularly to an operation processing method and device.

BACKGROUND

At present, a communication operation is a common function existing since the emergence of mobile phones and is also one of the most fundamental functions of the mobile phones. With the continuous development of various mobile phone applications, basic communication operations in the mobile phones have been gradually extended from calling to various contact methods including text messaging, multimedia messaging, mail sending, conducting video calls and so on.

Generally, a common operation during initiation of a call, a text message or a mail is to input or select a target number or address first before further executing a corresponding action in the related art. For example, it is necessary to input a call record via a dial pad or select a number from a contact list first before making a call. When a user needs to text back, it is also necessary to first find a number or a text message that requires a reply before replying to the text message.

Although functions including voice calls, text messages and so on have emerged for many years, operation methods that people are accustomed to have not been largely changed, and it is necessary to select an operation object first during most operations before executing a corresponding operation according to an interface provided in the selected object.

More and more operations have been involved between users during their contact with each other as user communication functions are becoming gradually complicated. For example, a user can only perform a calling operation originally in a contact list. Subsequently, text messages, multimedia messages, and mails are added, and even a reminder of the birthday of the user can also be implemented. Operations corresponding to each element are becoming more and more complex, which gradually complicates the current common operation method.

At present, there is no effective solution yet for the problem that device operations tend to become complex in the related art.

SUMMARY

Embodiments of the present disclosure provide an operation processing method and device, so as to at least solve the problem that device operations tend to become complex.

An operation processing method is provided according to an aspect of the embodiments of the present disclosure, including that: an element in a current interface is detected; at least one corresponding operation control is generated according to the element; and after it is determined that any one of the at least one operation control is moved onto the element, an operation corresponding to the moved operation control is executed on the element.

In an example embodiment, in a case that the element includes a plurality of sub-elements, that after it is determined that any one of the at least one operation control is moved onto the element, the operation corresponding to the moved operation control is executed on the element may include that: after it is determined that any one of the at least one operation control is moved onto the matched element, the plurality of sub-elements is displayed; and after it is determined that the operation control is moved onto one of the plurality of sub-elements, the operation corresponding to the moved operation control is executed on the sub-element.

In an example embodiment, the method may further include that: elements on the interface are classified into operational elements and non-operational elements, wherein the operational elements are in a state capable of being operated by an operation control and the non-operational elements are in a state not capable of being operated by an operation control.

In an example embodiment, after the operation corresponding to the moved operation control is executed on the element, the method may further include that: the non-operational elements are recovered to operational elements.

In an example embodiment, the element may include at least one of: a number, a contact, a pure text, and a multimedia; and/or the at least one corresponding operation control generated according to the element may include at least one of: calling, sending a text message, sending a multimedia message, and copying a text.

In an example embodiment, wherein the method may further include that: the operation control is moved into another interface, wherein in a case that it is detected that there is only one element, associated with the moved operation control, on the other interface, a service of the operation control corresponding to the element is executed directly when the operation control is moved to any place of the other interface; and in a case that it is detected that there is a plurality of elements, associated with the moved operation control, on the other interface, the other interface displays a technical feature for executing a service corresponding to the operation control on each of the plurality of elements.

In an example embodiment, the method may further include that: in a case that it is detected that there is a plurality of elements, associated with the moved operation control, on the interface, a technical feature for executing a service corresponding to the operation control on each of the plurality of elements is displayed.

In an example embodiment, the technical feature may include at least one of: a moving distance, a target location and a moving path.

An operation processing device is further provided according to another aspect of the embodiments of the present disclosure, including: a detecting component, configured to detect an element in a current interface; a generating component, configured to generate at least one corresponding operation control according to the element; and an executing component configured to execute, after it is determined that any one of the at least one operation control is moved onto the element, an operation corresponding to the moved operation control on the element.

In an example embodiment, in a case that the element includes a plurality of sub-elements, the executing component may be configured to display, after it is determined that any one of the at least one operation control is moved onto the matched element, the plurality of sub-elements; and execute, after it is determined that the operation control is moved onto one of the plurality of sub-elements, the operation corresponding to the moved operation control on the sub-element.

In an example embodiment, the device may further include: a classifying component, configured to classify elements on the interface into operational elements and non-operational elements, wherein the operational elements are in a state capable of being operated by an operation control and the non-operational elements are in a state not capable of being operated by an operation control.

In an example embodiment, the classifying component may be further configured to recover, after executing the operation corresponding to the moved operation control on the element, the non-operational elements to operational elements.

In an example embodiment, the element may include at least one of: a number, a contact, a pure text, and a multimedia; and/or the at least one corresponding operation control generated according to the element may include at least one of: calling, sending a text message, sending a multimedia message, and copying a text.

In an example embodiment, the executing component may be further configured to move the operation control into another interface, and configured to, in a case that it is detected that there is only one element, associated with the moved operation control, on the other interface, execute a service of the operation control corresponding to the element directly when the operation control is moved to any place of the other interface; and/or in a case that it is detected that there is a plurality of elements, associated with the moved operation control, on the other interface, display, on the other interface, a technical feature for executing a service corresponding to the operation control on each of the plurality of elements.

In an example embodiment, the device may further include: a displaying component configured to display, in a case that it is detected that there is a plurality of elements, associated with the moved operation control, on the interface, a technical feature for executing a service corresponding to the operation control on each of the plurality of elements.

In an example embodiment, the technical feature may include at least one of: a moving distance, a target location and a moving path.

By means of the embodiments of the present disclosure, an element in a current interface is detected, at least one corresponding operation control is generated according to the element, and after it is determined that any one of the at least one operation control is moved onto the element, an operation corresponding to the moved operation control is executed on the element, thus solving the problem that devices operations tend to become complex and improving user operation experience.

BRIEF DESCRIPTION OF THE DRAWINGS

The accompanying drawings described herein are used for providing further understanding to the embodiments of the present disclosure and form a part of the present application. The schematic embodiments of the present disclosure and description of the schematic embodiments are used for explaining the present disclosure, instead of forming improper limitation thereto. In the accompanying drawings.

DETAILED DESCRIPTION OF THE EMBODIMENTS

It needs to be noted that the embodiments in the present application and the characteristics in the embodiments may be combined with each other if there is no conflict. The present disclosure will be expounded below with reference to the accompanying drawings and in conjunction with the embodiments.

In the following embodiments, terminals may be mobile terminals (e.g. mobile phones, tablet computers), and may be also terminals of other types. Operating systems running on the terminals may be also various types of systems, e.g. Android systems broadly used at present, or Windows operating systems, iPhone Operating Systems (iOS), but the operating systems are not limited thereto.

Figure 1:
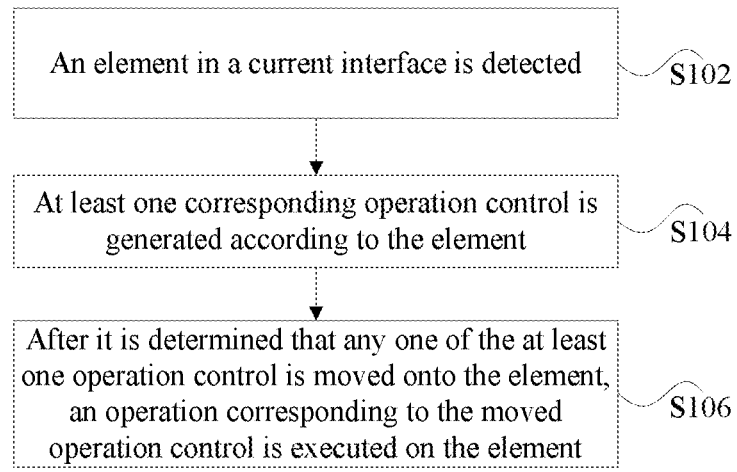
FIG. 1 is a flowchart of an operation processing method according to an embodiment of the present disclosure.

The present embodiment provides an operation processing method. FIG. 1 is a flowchart of an operation processing method according to an embodiment of the present disclosure. As shown in FIG. 1, the method includes the following steps.

Step S102: An element in a current interface is detected.

Step S104: At least one corresponding operation control is generated according to the element.

Step S106: After it is determined that any one of the at least one operation control is moved onto the element, an operation corresponding to the moved operation control is executed on the element.

By means of the steps in the embodiment, the element in the interface is not selected first before being subjected to the corresponding operation after the correlative selection. Instead, at least one corresponding operation control is generated for the element in the interface, after any one of the at least one operation control is moved onto the element directly, the operation corresponding to the moved operation control is executed, thus solving the problem that devices operations tend to become complex and improving user operation experience.

In the present embodiment, in a case that the element may include a plurality of sub-elements, the step that after it is determined that any one of the at least one operation control is moved onto the element, the operation corresponding to the moved operation control is executed on the element may include that: after it is determined that any one of the at least one operation control is moved onto the matched element, the plurality of sub-elements is displayed; and after it is determined that the operation control is moved onto one of the plurality of sub-elements, the operation corresponding to the moved operation control is executed on the sub-element. A sub-element corresponding to the element is further selected, so that the user has more choices, and the operation accuracy is improved.

For example, a mail element includes sub-elements such as an outbox, an inbox, a draft box when a mail is written on a terminal. An opening control is generated according to the mail element on the interface. After the opening control is moved onto the mail element, the mail element will further display the sub-elements including the outbox, the inbox, the draft box and so on, and the terminal opens the outbox after the opening control is further moved to the outbox.

In the present embodiment, elements of the interface may be classified after a corresponding operation control is selected from different corresponding operation controls. In an example embodiment, elements on the interface are classified into operational elements and non-operational elements, wherein the operational elements are in a state capable of being operated by an operation control and the non-operational elements are in a state not capable of being operated by an operation control. After the operation corresponding to the moved operation control is executed on the element, the non-operational elements are recovered to operational elements. The elements are classified after the corresponding operation control is selected, thereby preventing a user from misoperation during an operation process.

In the present embodiment, in a case that it is detected that there is a plurality of elements, associated with the moved operation control, on the current interface, a technical feature for executing a service corresponding to the operation control on each of the plurality of elements is displayed. The technical feature may include: a moving distance, a target location and a moving path. An element has various technical features, thus bringing different user experience to a user, and the user may select to perform different actions to the operation control so as to execute operations of services.

For example, a corresponding playing control is generated according to a current music interface. In a case that there is a plurality of songs that can be played on the current interface, the songs are sorted according to the number of listening times of a user, thus facilitating the user to select and play a song according to the playing control.

In the present embodiment, the element may include at least one of: a number, a contact, a pure text, and a multimedia; and/or the at least one corresponding operation control generated according to the element may include at least one of: calling, sending a text message, sending a multimedia message, and copying a text. The embodiments of the present disclosure are not limited to the above elements and operation controls, and different corresponding operation controls may be generated according to different functional elements of the interface.

In the present embodiment, the operation control not only can be operated on the current interface, but also can be moved onto a plurality of other interfaces to perform related operation. In an example embodiment, the operation control is moved into another interface, wherein in a case that it is detected that there is only one element, associated with the moved operation control, on the other interface, a service of the operation control corresponding to the element is executed directly when the operation control is moved to any place of the other interface; and in a case that it is detected that there is a plurality of elements, associated with the moved operation control, on the other interface, the other interface displays a technical feature for executing a service corresponding to the operation control on each of the plurality of elements. The technical feature may include: a moving distance, a target location and a moving path. The operation control is moved among different interfaces, thus providing more options for a user to operate autonomously, and improving the user experience.

An operation processing device is further provided in the present embodiment. The operation processing device is configured to implement the method above. What has been described in the embodiments and exemplary implementation modes above will not be repeated herein.

It needs to be noted that the names of components in the device as follows do not actually limit the components. For example, a detecting component may be described as "a component for detecting an element in a current interface". All components as follows may be implemented in a processor. For example, the detecting component may be described as "a processor, configured to detect an element in a current interface", or, "a processor, including a detecting component" and so on.

Figure 2:
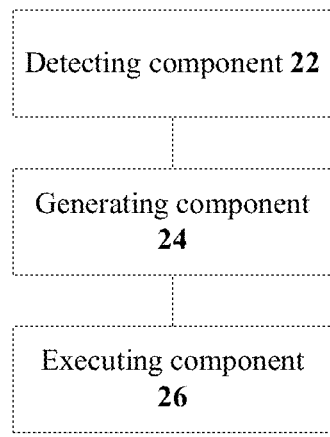
FIG. 2 is the first structural block diagram of an operation processing device according to an embodiment of the present disclosure.

FIG. 2 is the first structural block diagram of an operation processing device according to an embodiment of the present disclosure. As shown in FIG. 2, the device includes: a detecting component 22, a generating component 24 and an executing component 26. The structure will be described below.

The detecting component 22 is configured to detect an element in a current interface.

The generating component 24 is configured to generate at least one corresponding operation control according to the element.

The executing component 26 is configured to execute, after it is determined that any one of the at least one operation control is moved onto the element, an operation corresponding to the moved operation control on the element.

By means of device, the element in the interface is not selected first before being subjected to the corresponding operation after the correlative selection. Instead, at least one corresponding operation control is generated for the element in the interface, after any one of the at least one operation control is moved onto the element directly, the operation corresponding to the moved operation control is executed, thus solving the problem that devices operations tend to become complex and improving user operation experience.

In the present embodiment, in a case that the element includes a plurality of sub-elements, the executing component is configured to display, after it is determined that any one of the at least one operation control is moved onto the matched element, the plurality of sub-elements; and execute, after it is determined that the operation control is moved onto one of the plurality of sub-elements, the operation corresponding to the moved operation control on the sub-element.

Figure 3:
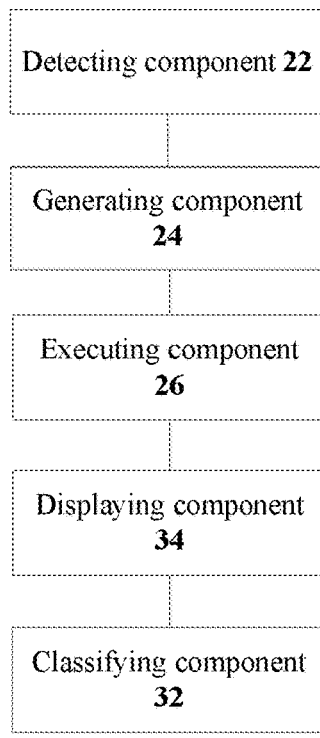
FIG. 3 is the second structural block diagram of an operation processing device according to an embodiment of the present disclosure.

FIG. 3 is the second structural block diagram of an operation processing device according to an embodiment of the present disclosure. As shown in FIG. 3, the device includes: a detecting component 22, a generating component 24, an executing component 26, a classifying component 32 and a displaying component 34. Functions implemented by the detecting component 22, the generating component 24 and the executing component 26 are the same as those described above, and will not be described repeatedly herein. The device will be described below.

The classifying component 32 is configured to classify elements on the interface into operational elements and non-operational elements, wherein the operational elements are in a state capable of being operated by an operation control and the non-operational elements are in a state not capable of being operated by an operation control, and the classifying component is further configured to recover, after executing the operation corresponding to the moved operation control on the element, the non-operational elements to operational elements.

The displaying component 34 is configured to display, in a case that it is detected that there is a plurality of elements, associated with the moved operation control, on the interface, a technical feature for executing a service corresponding to the operation control on each of the plurality of elements, wherein the technical feature includes: a moving distance, a target location and a moving path.

In the present embodiment, the executing component 26 is further configured to move the operation control into another interface, and further configured to, in a case that it is detected that there is only one element, associated with the moved operation control, on the other interface, execute a service of the operation control corresponding to the element directly when the operation control is moved to any place of the other interface; and/or in a case that it is detected that there is a plurality of elements, associated with the moved operation control, on the other interface, display, on the other interface, a technical feature for executing a service corresponding to the operation control on each of the plurality of elements.

The present disclosure will be described below in conjunction with exemplary embodiments and implementation modes.

Exemplary Embodiment 1

The present exemplary embodiment provides a method capable of initiating an operation rapidly, which completely separates an initiating entry of the operation and a corresponding element. Corresponding operation controls are set on various interfaces that can be operated on a mobile phone. The operation controls can be dragged through a touch screen. When a user drags an operation control to a specific interface element, a corresponding operation is initiated directly to the interface element.

Operation types of the operation controls and the number of the operation controls are generated automatically according to elements on the interfaces. For example, there are numbers, contact persons and pure texts on an interface of a text message list, thus operation controls to be shown on the interface should be calling, sending a text message, sending a multimedia message, and copying a text correspondingly. When a number that can be called is on a current page of a browser interface, a dialling control is generated automatically and displayed on the interface to be operated by a user. When there is no number that can be operated on the current page after the operation of the user, the dialling control disappears automatically.

In the present exemplary embodiment, after a user selects a certain corresponding operation control, all elements that are not related to the operation control on an interface are in a non-operational state. For example, when the user drags a calling operation control, an element in an operational state on the interface should only be an element on which a calling operation can be executed. When the user cancels the operation on the operation control, the interface is recovered to the original state.

In the present embodiment, when an element of the interface includes a plurality of sub-elements, an operation feature of an operation control can be dragged again to select a sub-element among the plurality of sub-elements so as to initiate an operation. For example, a plurality of numbers is saved in a contact list, and when a dialling control is dragged onto an avatar associated with a contact, a plurality of numbers in the contact may be displayed, and the dialling control is dragged for a second time to select a required number for dialling, wherein the operation feature may be a specific dragging distance, a specific target location, a path and so on.

In the exemplary embodiment, a user can freely place, in the interface that can be operated, different elements on the same page.

Figure 4:
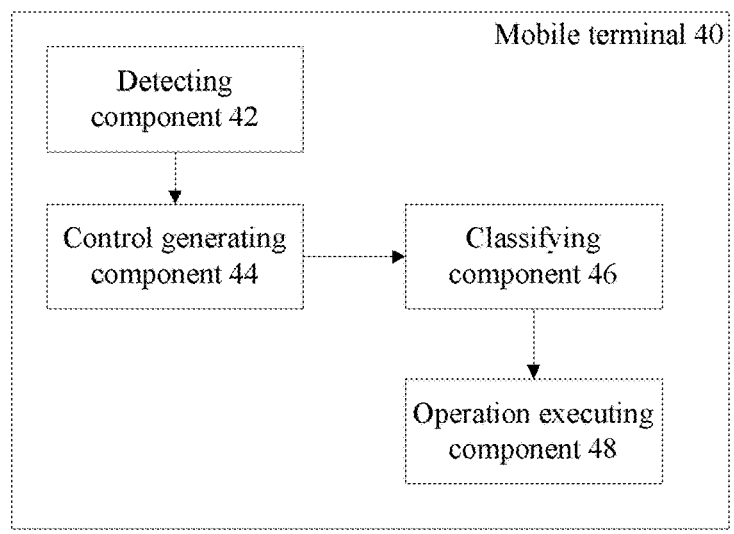
FIG. 4 is a structural block diagram of an operation processing device of a mobile terminal according to an exemplary embodiment of the present disclosure.

FIG. 4 is a structural block diagram of an operation processing device of a mobile terminal according to an exemplary embodiment of the present disclosure. As shown in FIG. 4, the mobile terminal 40 includes: a detecting component 42, a control generating component 44, a classifying component 46 and an operation executing component 48. In the mobile terminal, functions implemented by the detecting component 42, the control generating component 44, the classifying component 46 and the operation executing component 48 are the same as those implemented by the detecting component 22, the generating component 24, the classifying component 32 and the executing component 26. The device will be described below.

The detecting component 42 is configured to detect all operations supported by each element of a current interface.

The control generating component 44 is configured to generate, according to the executable operations detected by the operation detecting component, corresponding operation controls on the interface of a mobile phone.

The classifying component 46 is configured to classify, according to the type of the operation control being operated by a user, all elements on the interface into elements that can be operated by the current operation control and elements that cannot be operated by the current operation control. The mobile terminal sets the operational elements as an operational state and the non-operational elements as a non-operational state.

The operation executing component 48 is configured to execute, according to an interface operation that the user drags the operation control to a corresponding operational element, a corresponding terminal action.

The user is more used to two operations including sliding and clicking on a screen, thus the method provided by the present exemplary embodiment provides more sense of operation to the user when the user uses a function of the mobile phone, and implements better user experience.

The present exemplary embodiment separates an operation from an operated element, thus the user is enabled to freely place different elements in the same page. For example, a music element and a text message element are placed together, and when the user operates a control related to the music element, the text message element is in an non-operational state, and otherwise, the music element is in a non-operational state, thus greatly improving the freedom of operation for the user during use without causing operation chaos, and extraordinary operation pleasure may be brought to the user.

Exemplary Embodiment 2

Figure 5:
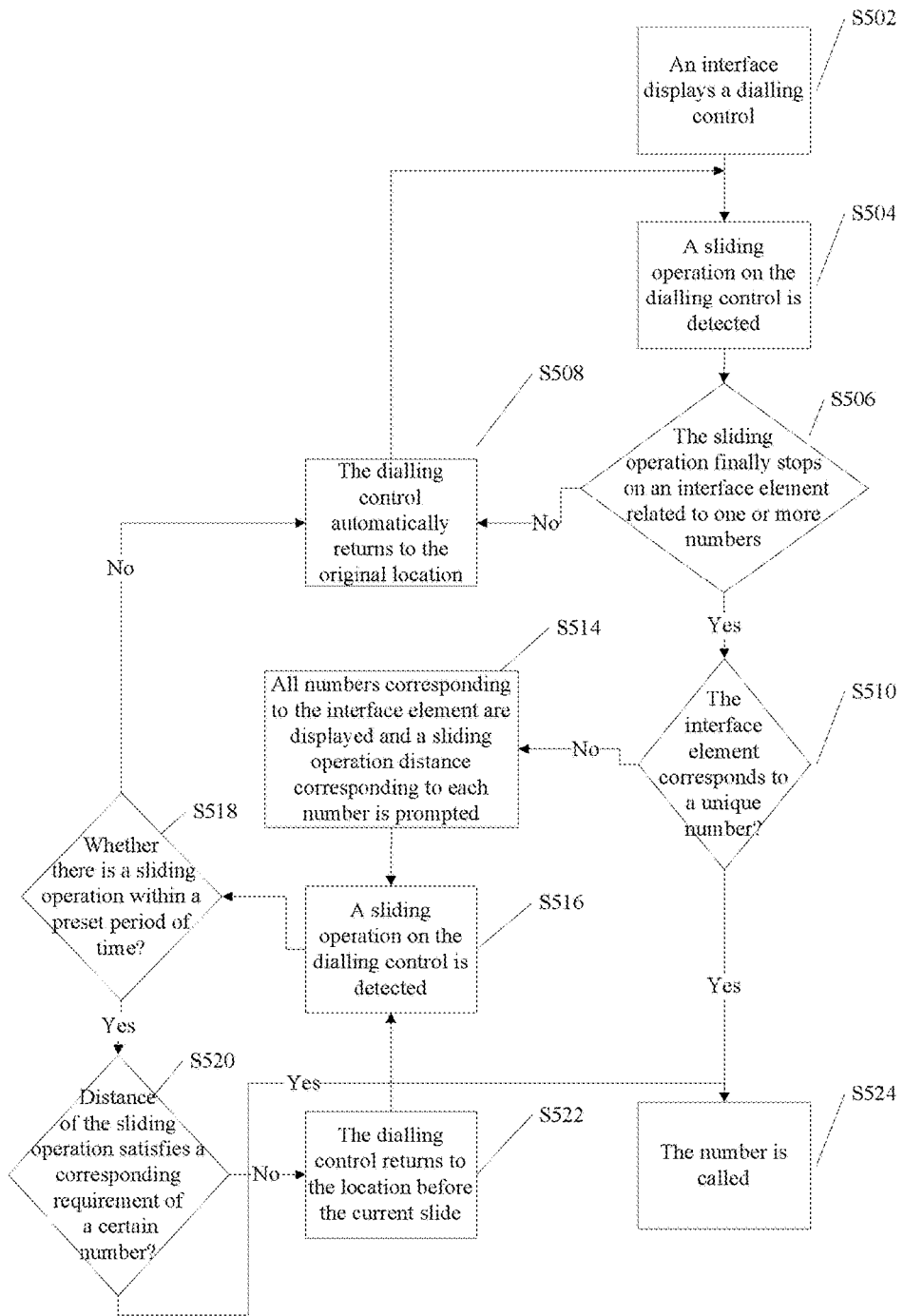
FIG. 5 is a flowchart of operation processing of a mobile terminal according to an exemplary embodiment of the present disclosure.

FIG. 5 is a flowchart of operation processing of a mobile terminal according to an exemplary embodiment of the present disclosure. As shown in FIG. 5, since the method of the present exemplary embodiment is applicable to all components, FIG. 5 describes the operation processing process of the exemplary embodiment by taking a typical service, i.e. initiation of a voice call, in a mobile phone as an example. The flowchart includes the following steps.

Step S502: A dialling control that can be dragged is generated on an interface where an element that can be called exists, such as a contact list, a dial pad, a text message list and so on.

Step S504: When the mobile phone enters the interface that contains the dialling control, a sliding operation on the dialling control is detected.

Step S506: After an operation of dragging the dialling control is detected, whether the final location of the drag stops on an interface element related to one or more numbers is judged.

Step S508: If the dialling control is not dragged onto an interface element related to one or more numbers, the dialling control returns to the original location automatically and waits for the next operation.

Step S510: If the dialling control is finally dragged onto an interface element related to one or more numbers, whether the element corresponds to a unique number is judged.

Step S512: If the interface element corresponds to a unique number, e.g. a call record, a contact that only includes one number, or a text message which does not include any number in a text (only including one sender number), the number is called directly.

Step S514: If the interface element corresponds to a plurality of numbers, each number is displayed (or other corresponding identifying information of the number, e.g. a name, description), and a corresponding distance that the dialling control needs to be slid to initiate a call to each number is prompted on the interface.

Step S516: A sliding operation on the dialling control is detected.

Step S518: If a user fails to operate within a preset period of time, the dialling control returns to the initial location automatically, and the processing process is terminated to wait for the next operation of the user.

Step S520: If the user operates the dialling control in time, whether a distance that the user drags the dialling control satisfies a distance requirement corresponding to a certain number is judged.

Step S522: If the operation of the user fails to satisfy a corresponding requirement of any number, the dialling control returns to the location before the operation of the user to wait for the user to select a number through a sliding operation to make a call.

Step S524: Otherwise, if the operation of the user satisfies a corresponding distance requirement of a certain number, the number is called directly.

By means of the steps above, when one dialling control exists on each interface with an element that can be dialled, a user may drag the call control to any element that contains a number to initiate a call. When the element contains more than one numbers, a dragging operation feature of each number will be displayed on the interface. In the exemplary embodiment, the feature may be a corresponding dragging distance. When an operation of the user on the dialling control satisfies a feature corresponding to a certain number, the number is called.

The mobile operation processing device includes: a detecting component, a control generating component, a classifying component, and an operation executing component. Functions of the components are the same as those of the detecting component 42, the control generating component 44, the classifying component 46 and the operation executing component 48 in the embodiment. The device will be expounded below.

The detecting component is responsible for detecting operations that can be supported by all elements of a current page, and after the detection, delivering operations that can be executed on the current page to the control generating component. The control generating component generates corresponding operation controls on an interface.

After a user operates a certain control, the classifying component starts to become effective to classify all elements on the interface into operational elements and non-operational elements according to the control currently operated by the user, and set the operational elements to an operational state, and the non-operational elements to a non-operational state. When the user operates the current operation control and initiates an operation to a certain operational element, e.g. the user drags the operation control onto the operational element, the operation executing component is started to execute the operation of the user on the element.

Finally, a mobile phone interface, an application and a radio frequency and so on respond to the operation, so as to complete the whole operation process.

Exemplary embodiments and implementation modes of the present disclosure will be described below in combination with specific application scenarios.

Figure 6:
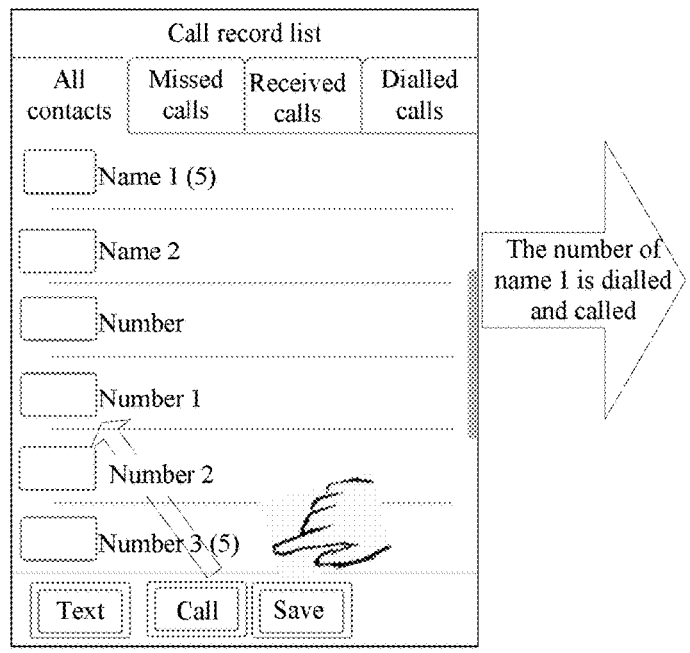
FIG. 6 is a schematic diagram of initiating a call from call records according to an exemplary embodiment of the present disclosure.

FIG. 6 is a schematic diagram of initiating a call from call records according to an exemplary embodiment of the present disclosure. As shown in FIG. 6:

an operation control locates at the bottom of a screen. As shown in FIG. 6, a text message sending and a calling operation may be implemented on the name of a contact in the page, and an operation of saving a contact person may be also performed on a telephone number besides these two operations. Therefore, three operation controls including a text message sending, a calling and a saving operation are generated automatically on the page at the bottom of the screen.

When a user drags a telephone dialling control to name 1 with fingers, a mobile phone dials a number to call name 1 in response to the operation.

Figure 7:
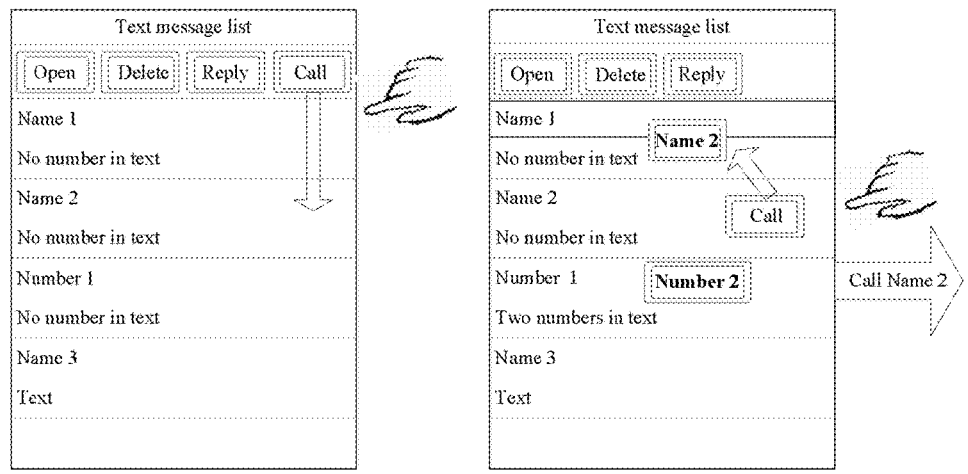
FIG. 7 is a schematic diagram of application of a text message component according to an exemplary embodiment of the present disclosure.

FIG. 7 is a schematic diagram of application of a text message component according to an exemplary embodiment of the present disclosure. As shown in FIG. 7:

there is a plurality of text messages in a text message list, wherein there is no number in a text of a latest text message sent from a sender entitled name 1, there is a number that is identified as a telephone number in a text of a latest text message sent from a sender entitled name 2, and there are two numbers that are identified as telephone numbers in a text of a latest text message sent from the sender of number 1.

In the present exemplary embodiment, text messages are the only elements that can be operated on a current interface, while elements that can be operated in the text messages include senders of the text messages, and one or more numbers contained in text of the text messages. Operations corresponding to the text message include: opening, deletion, and replying to the text message while operations corresponding to the senders of the text messages and the numbers contained in the text of the text messages include replying to the text message, and calling. Therefore, 4 operation controls including opening, deletion, replying and calling are displayed on the current interface.

When a user operates the calling control, and drags the control onto the text message of name 2, the user needs to operate the control again to select an element to call in the present exemplary embodiment since there are two elements that can be called in the text message, i.e. name 2, and telephone number 2 in the text message.

A method for distinguishing operational elements according to different target locations is applied in the present exemplary embodiment. After the user drags the calling control to the location where name 2 locates, other elements on the interface are in a non-operational state, and there are two objects that can be called on different locations: name 2 and number 2. At the moment, the user drags the calling control again onto name 2, so as to initiate a calling operation on name 2 directly.

Figure 8:
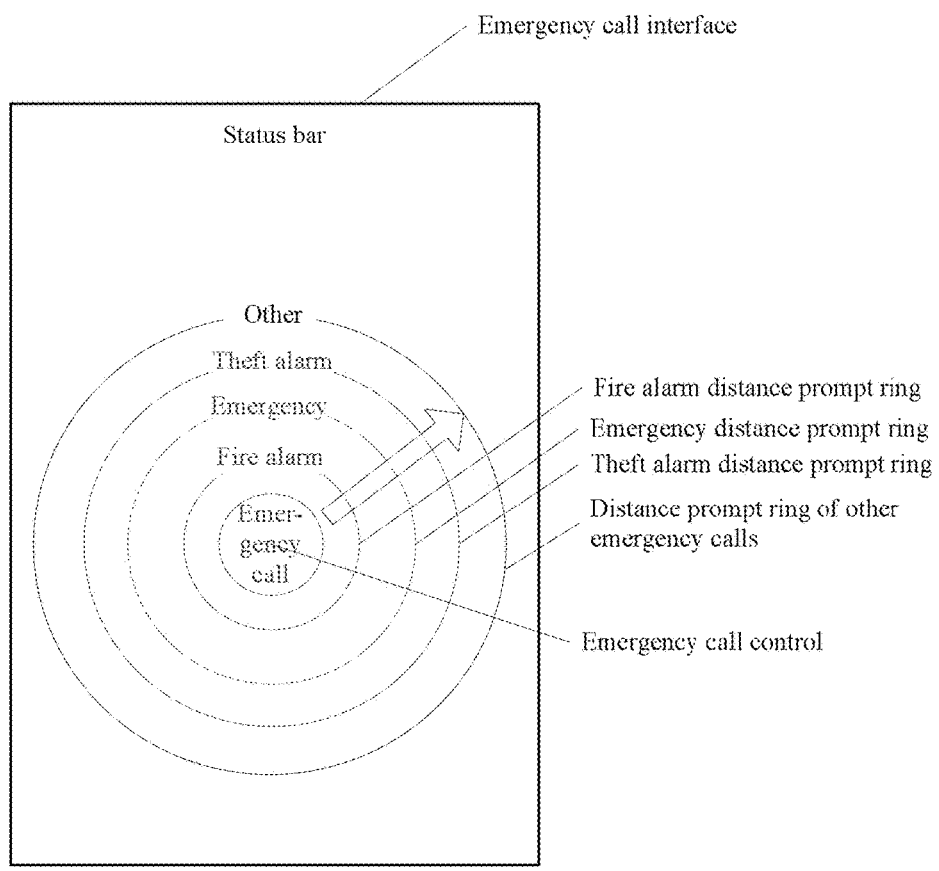
FIG. 8 is a schematic diagram of an emergency calling function according to an exemplary embodiment of the present disclosure.

FIG. 8 is a schematic diagram of an emergency calling function according to an exemplary embodiment of the present disclosure. As shown in FIG. 8:

at present, many domestic users are unaware of emergency call numbers that can be dialled and functions corresponding to these numbers, thus the users fail to know numbers that can be called in many emergencies. An emergency call interface is not necessarily called with a dial in the present exemplary embodiment. As shown in FIG. 8, elements that can be called in an emergency call interface are fixed numbers including a fire alarm number, a theft alarm number, an emergency telephone number and so on, and these numbers may be generated automatically and placed on the interface, thus avoiding the situation that a user may fail to clearly memorize corresponding relations between the numbers and functions when the user has an input.

A unique operation that can be performed by these emergency call numbers is to initiate an emergency call, thus an emergency call control is set. With regard to display effect, when the user drags a dialling control onto the emergency call control manually, a mobile phone automatically displays an emergency call number that can be called, or a corresponding function (e.g. 120 is displayed as an "emergency call" directly, and 114 is displayed as a "traffic accident" directly) and prompts the user of a method for further dragging to dialling control to initiate the emergency call. In an embodiment of FIG. 9, it is apparent that a user is able to select, according to a dragging distance, a number to call, which is an extremely free and user-friendly operation method. As long as the final dragging distance satisfies a judgment standard of a certain element, an emergency call can be initiated to the element regardless of a direction to which the user drags the control.

In the present exemplary embodiment, the user is able to initiate a necessary emergency call at any time conveniently without memorizing an emergency call number.

During application of a mobile phone terminal, some elements on a current interface may be hidden or disappear sometimes after an operation of a user, and operation controls that can be operated can be updated automatically in the present exemplary embodiment.

Figure 9:
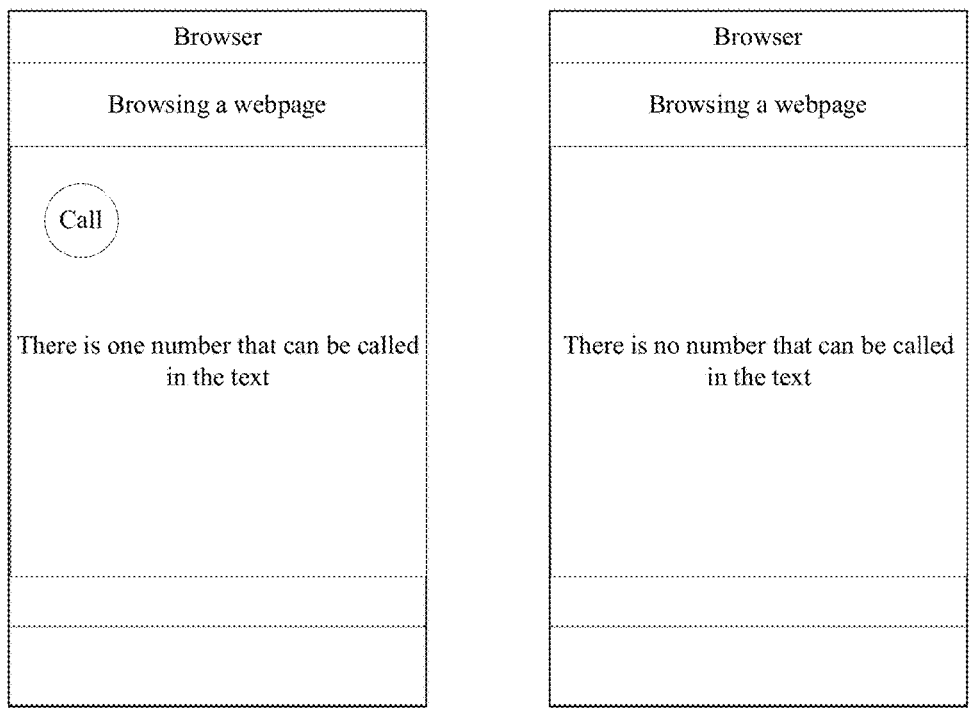
FIG. 9 is a schematic diagram of a page turning operation according to an exemplary embodiment of the present disclosure.

FIG. 9 is a schematic diagram of a page turning operation according to an exemplary embodiment of the present disclosure. As shown in FIG. 9, for example, numbers that may be called may exist in a page of a browser sometimes. However, as a user performs an operation, such as a page turning operation, these numbers may further disappear. At the moment, whether it is necessary to display a dialling control on the current page may be judged automatically according to the existence of a number control that can be called in the current page.

As shown in FIG. 9, when a number that can be called exists in a browsing page of a browser, the browser displays a dialling control. A user can initiate a call directly by dragging the control onto the number. When the user changes a display content of the page so that the number disappears, the dialling control also disappears.

Compared with the related art, the method is not only convenient to operate, but also able to somewhat prompt a user by displaying or hiding the dialling control.

Obviously, those skilled in the art should understand that, each component or each step in the embodiments of the present disclosure may be implemented by a universal computing device. They may be concentrated on a single computing device or distributed on a network composed of a plurality of computing devices. Optionally, they may be implemented by program codes executable by a computing device so that they may be stored in a storing device and executed by the computing device, or they may be implemented by respectively fabricating them into each integrated circuit component, or by fabricating a plurality of components or steps of them into a single integrated circuit component. In this way, the present disclosure is not limited to any specific combination of software and hardware.

The above are only exemplary embodiments of the present disclosure, but are not used for limiting the present disclosure. For those skilled in the art, the present disclosure may have various alterations and variations. Any modification, equivalent replacement, improvement and so on made within the principle of the present disclosure should be included within the scope of protection defined by the claims of the present disclosure.

INDUSTRIAL APPLICABILITY

The technical solutions provided by the embodiments of the present disclosure may be applied to the field of communications, so as to solve the problem that devices operations tend to become complex and improve user operation experience.

What is claimed is:

1. An operation processing method, comprising:
   detecting an element in a current interface;
   generating at least one corresponding operation control according to the element;
   acquiring a location of the drag stops and after it is determined that any one of the at least one operation control is moved onto the element, executing an operation corresponding to the moved operation control on the element; and
   in a case that it is detected that there is a plurality of elements, associated with the moved operation control, on the interface, displaying a technical feature for executing a service corresponding to the operation control on each of the plurality of elements.

2. The method as claimed in claim 1, wherein in a case that the element comprises a plurality of sub-elements, after it is determined that any one of the at least one operation control is moved onto the element, executing the operation corresponding to the moved operation control on the element comprises:
   after it is determined that any one of the at least one operation control is moved onto the matched element, displaying the plurality of sub-elements; and
   after it is determined that the operation control is moved onto one of the plurality of sub-elements, executing the operation corresponding to the moved operation control on the sub-element.

3. The method as claimed in claim 1, further comprising:
   classifying elements on the interface into operational elements and non-operational elements, wherein the operational elements are in a state capable of being operated by an operation control and the non-operational elements are in a state not capable of being operated by an operation control.

4. The method as claimed in claim 3, wherein after executing the operation corresponding to the moved operation control on the element, the method further comprises:
recovering the non-operational elements to operational elements.

5. The method as claimed in claim 1, wherein the element comprises at least one of: a number, a contact, a pure text, and a multimedia; and/or the at least one corresponding operation control generated according to the element comprises at least one of: calling, sending a text message, sending a multimedia message, and copying a text.

6. The method as claimed in claim 1, further comprising:
moving the operation control into another interface, wherein in a case that it is detected that there is only one element, associated with the moved operation control, on the other interface, directly executing a service of the operation control corresponding to the element when the operation control is moved to any place of the other interface; and
in a case that it is detected that there is a plurality of elements, associated with the moved operation control, on the other interface, displaying, on the other interface, a technical feature for executing a service corresponding to the operation control on each of the plurality of elements.

7. The method as claimed in claim 6, wherein the technical feature comprises at least one of: a moving distance, a target location and a moving path.

8. The method as claimed in claim 1, wherein the technical feature comprises at least one of: a moving distance, a target location and a moving path.

9. An operation processing device, comprising:
a detecting component, configured to detect an element in a current interface;
a generating component, configured to generate at least one corresponding operation control according to the element; and
an executing component configured to execute, acquire a location of the drag stops and after it is determined that any one of the at least one operation control is moved onto the element, an operation corresponding to the moved operation control on the element;
a displaying component configured to display, in a case that it is detected that there is a plurality of elements, associated with the moved operation control, on the other interface, on the other interface, a technical feature for executing a service corresponding to the operation control on each of the plurality of elements.

10. The device as claimed in claim 9, wherein in a case that the element comprises a plurality of sub-elements, the executing component is configured to display, after it is determined that any one of the at least one operation control is moved onto the matched element, the plurality of sub-elements; and execute, after it is determined that the operation control is moved onto one of the plurality of sub-elements, the operation corresponding to the moved operation control on the sub-element.

11. The device as claimed in claim 10, wherein the classifying component is further configured to recover, after executing the operation corresponding to the moved operation control on the element, the non-operational elements to operational elements.

12. The device as claimed in claim 9, further comprising:
a classifying component, configured to classify elements on the interface into operational elements and non-operational elements, wherein the operational elements are in a state capable of being operated by an operation control and the non-operational elements are in a state not capable of being operated by an operation control.

13. The device as claimed in claim 9, wherein the element comprises at least one of: a number, a contact, a pure text, and a multimedia; and/or the at least one corresponding operation control generated according to the element comprise at least one of: calling, sending a text message, sending a multimedia message, and copying a text.

14. The device as claimed in claim 9, wherein the executing component is further configured to move the operation control into another interface, and configured to, in a case that it is detected that there is only one element, associated with the moved operation control, on the other interface, execute a service of the operation control corresponding to the element directly when the operation control is moved to any place of the other interface; and/or in a case that it is detected that there is a plurality of elements, associated with the moved operation control, on the other interface, display, on the other interface, a technical feature for executing a service corresponding to the operation control on each of the plurality of elements.

15. The device as claimed in claim 14, wherein the technical feature comprises at least one of: a moving distance, a target location and a moving path.

* * * * *